United States Patent [19]

Zirn et al.

[11] 4,323,167

[45] Apr. 6, 1982

[54] INSULATING CONTAINER FOR COOKING FOOD

[76] Inventors: Rudolf F. Zirn, Franz-von-Ried-Str. 6/VII, 8960 Kempten, Allg.; Erich Karlsen, Untere Eberhalde 70A, 8992 Wasserburg, both of Fed. Rep. of Germany

[21] Appl. No.: 102,155

[22] Filed: Dec. 10, 1979

[30] Foreign Application Priority Data

Apr. 10, 1979 [DE] Fed. Rep. of Germany ....... 2940346

[51] Int. Cl.³ .................. A47J 36/36; B65D 25/28
[52] U.S. Cl. ..................................... 220/408; 126/375; 220/4 B; 220/411; 220/902; 220/94 A
[58] Field of Search ............... 220/4 B, 408, 410, 411, 220/412, 902, 94 A; 126/375

[56] References Cited

U.S. PATENT DOCUMENTS

| 955,733 | 4/1910 | Winter | 220/408 |
| 968,925 | 8/1910 | Ferguson | 220/411 |
| 983,408 | 2/1911 | Pierson | 220/408 |
| 1,298,202 | 3/1919 | Hall | 220/408 |
| 1,501,231 | 7/1924 | Parry | 220/411 |
| 1,503,762 | 8/1924 | Mock | 220/408 |
| 3,054,395 | 9/1962 | Torino | 126/375 |
| 3,251,460 | 5/1966 | Edmonds | 220/94 A |
| 4,058,214 | 11/1977 | Moncuso | 220/902 |
| 4,114,759 | 9/1978 | Maloney | 220/410 |

*Primary Examiner*—George E. Lowrance
*Attorney, Agent, or Firm*—Kane, Dalsimer, Kane, Sullivan and Kurucz

[57] ABSTRACT

The disclosure is of a container for maintaining the temperature of cooked foods. The container encloses a cooking implement such as a cooking pot containing cooked foods. The container is a two-part assembly which comprises a lower, pot supporting insert and a cover for the insert.

6 Claims, 2 Drawing Figures

INSULATING CONTAINER FOR COOKING FOOD

BACKGROUND OF THE INVENTION

1. Field of the Invention

The invention relates to containers and more particularly relates to an insulating container for cooking food with a lower insert for supporting the cooking implement and a cover for the insert.

2. Brief Description of the Prior Art

A number of cooking devices and cooking methods are known and have as an object the prevention of burning, overcooking or undercooking of food. A further object may be to maintain food at a service temperature, as long as required, without reheating the food. This is very important, especially in oriental households, to preserve the taste and visual appearance of the food. Different solutions to the aforegoing problems were tried and are known. For example, wrapping preheated or prefried food in newspapers and further in bedsheets and placing the food in a heater oven or, for example, in the classic cooking box, the steam pot (cooker) etc. It also has been suggested to place cooking pots in an insulating container. For this purpose, insulating containers are constructed having inserts or support bottoms which correspond to the pot shapes and which are provided with a cover. This construction solved the problem of maintaining the serving temperature of preheated food without any further heating. However, the disadvantage of such a solution is that the insulating container had to correspond to the cooking pot shape. It was always difficult to remove the pots from the insulating container. Very often the housewife was not able to remove the pot from the insulating container without somebody assisting her by holding the insulating container in place. A further disadvantage was the need to have the correct insulating container for each possible shape of cook pot used in the average household. Furthermore, it has been shown that cooking in such insulating containers does not meet the requirements of increased demands. A further disadvantage is that a flush placing of the cover onto the bottom or insert very often resulted in jamming of the cover, so that the cover could not be removed. The airtight seal between the cover, or the lid, and the container bottom resulted in a vacuum within the insulated container during a cooling off period, so that a considerable force was required to open the container. Therefore, the food was often spilled.

It is an object of the present invention to develop an insulating container which assures an improved heat conductivity, which is independent from the pot shape and which excludes a vacuum forming within the insulating container.

SUMMARY OF THE INVENTION

The invention comprises an insulating container assembly for cooking foods, which comprises;

a tubular cover having a first closed end, a second open end and a bore communicating between the ends;

a tubular insert having a first open end, a second closed end and a bore communicating between the ends thereof;

said insert having a smaller outer diameter than the diameter of the bore of said cover whereby when the first open end of the insert is inserted into the second open end of the cover a slot is formed between the open end of the insert and the open end of the cover, said slot communicating between the bore of the cover and outside of the container;

said bores being adapted by size and configuration to receive a cooking implement.

DETAILED DESCRIPTION OF THE PREFERRED EMBODIMENTS OF THE INVENTION

Figure 1:
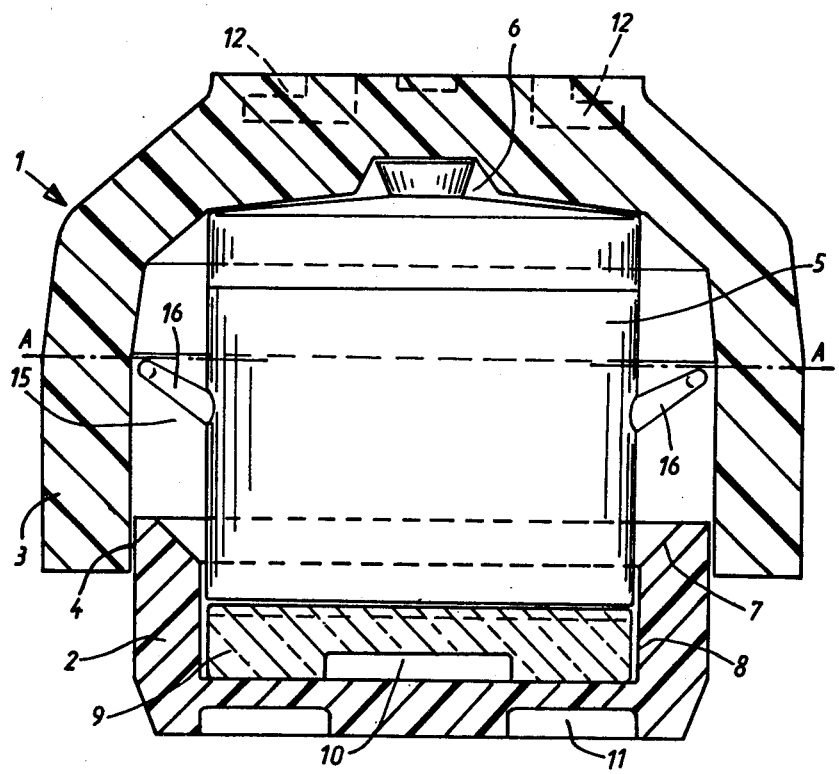
FIG. 1 is a cross-sectional side elevation of a preferred embodiment container of the invention.
Figure 2:
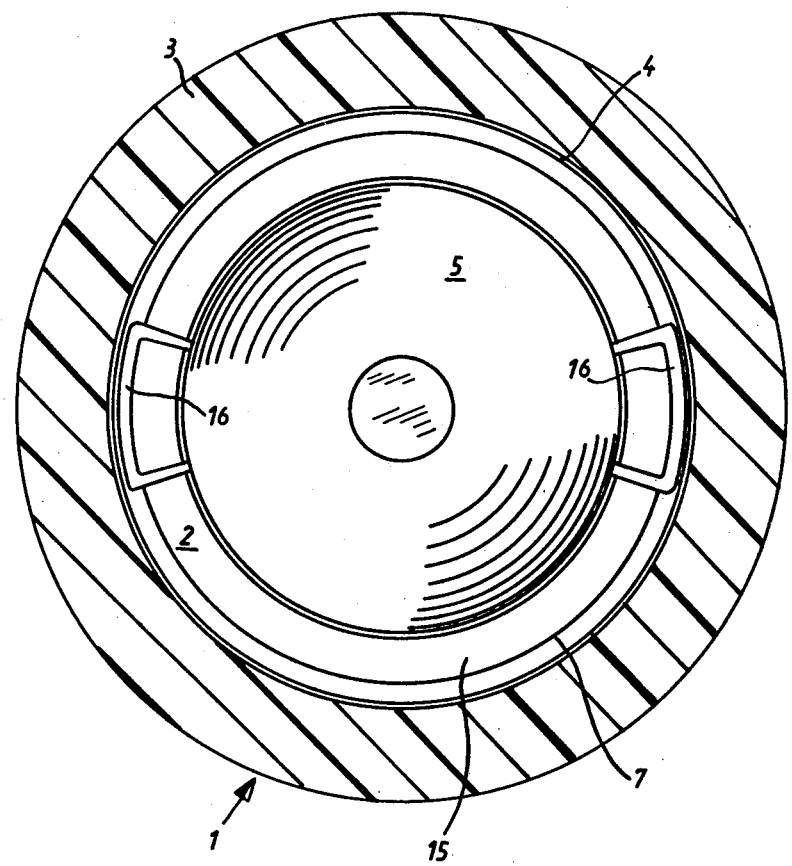
FIG. 2 is a view along lines A—A of FIG. 1.

FIG. 1 is a cross-sectional side view of an insulating container 1 embodiment of the invention consisting of an insert 2 and a cover 3. Insert 2 functions to hold a cooking implement in place, for example a cooking pot 5. Insert 2 may have a round shape, so as to correspond to the shape of the cooking pot 5. On its upper side the insert 2 is provided with an incline 7 to accommodate receiving the lower portion of the cooking pot, pans etc. This incline 7 borders a cylindrical recess 8. A removable disc 9 is inserted into recess 8. This disc 9 may be made of asbestos, rubber, glass fiber reinforced plastic or like heat-resistant and inexpensive material. The disc 9 increases the life span of the insulating container 1. Food spilled during placement of the cooking pot 5 and burned leftover food on the lower end of the cooking pot 5 will contaminate and partially plug the recess 8 of insert 2. Disc 9 permits one to replace that part of insert 2 which is most subject to wear, spillage and plugging as described above. Replacement of disc 9 may be made from time to time. The disc 9 may also be provided with a recess 10 in its lower surface to reduce weight. Insert 2 is provided at its lower surface with identations 11 to facilitate gripping. Cover 3 has a larger inner diameter than the outer diameter of insert 2, so that it does not sit flush on the upper edge of insert 2 but encompasses the edge and leaves a slot 4 between cover 3 and insert 2 when the cover 3 is placed to close the open end of insert 2. The slot 4 prevents the formation of a vacuum inside container 1. The inner shape of cover 3 advantageously corresponds to the shape of a cooking pot or a pan. In the embodiment of FIG. 1, the inside of cover 3 is provided with a recess 6 to accommodate the lid handle of the cooking pot 5. The upper end of cover 3 may also have indentations 12 to facilitate gripping with one's fingers. In order to obtain one of the above stated objectives, i.e.; to assure a sufficient heat transfer, cover 3 is so dimensioned that its cylindrical portion encompasses the highest shape of the cooking pot 5 and also the pot handles 16. This can be seen in FIG. 2 which is a view along lines A—A of FIG. 1. It will be observed that the cover 3 is not snug with respect to the outer wall of the cooking pot 5. An empty space 15 is provided between the inner surface of cover 3 and the outside of the cooking pot 5. This feature is advantageous for reducing heat transfer, the formation of an air buffer and it also prevents a jamming of the pot 5 in the container 1. The construction of the container 1 has the following advantages.

Since insert 2 and cover 3 are not superimposed in a flush engagement with each other, in contrast to hitherto known devices, but are mated with each other in a box-like fashion, they form the slot 4 therebetween. Preferably the slot 4 has a size obtained by providing the cover 3 and insert 2 in a size relationship whereby the ratio of the outer diameter of the insert 2 to the diameter of the inside of the cover 3 is within the range of from 32:35 to 33.2:35.0. The cover 3 seats on the cover of the cooking pot 5 and can be displaced upwardly or downwardly without any problems. In this way one or a plurality of pots may be stacked on top of each other and placed in the insert 2. Naturally, larger pots should be placed on the bottom and smaller ones on top when stacking a number of pots. The cooking effect is not impaired even when in an extreme situation the upper edge of insert 2 is not overlapped with the lower edge of cover 3, but remains on the same level or above when a plurality of pots are stacked on each other inside the container 1.

The embodiment container 1 of the invention may be fabricated from conventional thermal insulating materials. Representative of such materials are synthetic, polymeric resin foams such as foamed urea resins, phenolic resins, polystyrene, polyurethane, polyvinylchloride and the like. Preferably, the foamed resins are of the closed cell type. Advantageously, the foamed resins will have a weight between 45 and 100 Kp/m$^3$, preferably around 60 Kp/m$^3$. The foam material will advantageously be resistant to degradation at temperatures of up to 60° C. to 130° C. and preferably at least up to about 110° C.

The container 1 may be fabricated in any size to contain any cooking pots etc. Preferably the inside of the cover 3 is cylindrical in shape for ⅓ to ⅔ of its length to receive the cooking pot 5, measured from the open end.

What is claimed is:

1. An insulating container assembly for holding a pot containing cooking food, which comprises;
    a tubular cover made from a thermally insulating material and having a first closed end, a second open end and a bore communicating between the ends;
    a tubular insert made from a thermally insulating material and having a first open end, a second closed end and a bore communicating between the ends thereof;
    said insert having a smaller outer diameter than the diameter of the bore of said cover whereby when a cooking pot is received in the bore of the insert and the first open end of the insert is inserted into the second open end of the cover until the cover seats on the pot, a slot is formed between the open end of the insert and the open end of the cover; said slot communicating between the bore of the cover and outside of the container; at a point on the open end of the tubular container and below the open end of the insert;
    said bores being adapted by size and configuration to receive a cooking pot.

2. The assembly of claim 1 wherein the ratio of the outer diameter of the insert to the diameter of the bore of the cover is within the range of from 32:35 to 33.2:35.0.

3. The assembly of claim 1 wherein the bore of the insert contains a removable disc of heat-resistant material to support a cooking implement thereon.

4. The assembly of claim 1 wherein said cover has a means to facilitate gripping with fingers.

5. The assembly of claim 1 wherein said insert has a means of gripping with fingers.

6. The assembly of claim 1 wherein the bore of the cover is cylindrical in shape for ⅓ to ⅔ of its length, measured from the open end of said cover.

* * * * *